US012583788B2

(12) United States Patent
Alderman et al.

(10) Patent No.: US 12,583,788 B2
(45) Date of Patent: Mar. 24, 2026

(54) METHODS OF COOLING GLASSES POST-ION EXCHANGE

(71) Applicant: CORNING INCORPORATED, Corning, NY (US)

(72) Inventors: Bethany Jon Alderman, Bath, NY (US); Alyssa Michelle Sergiyenko, Bath, NY (US)

(73) Assignee: CORNING INCORPORATED, Corning, NY (US)

( * ) Notice: Subject to any disclaimer, the term of this patent is extended or adjusted under 35 U.S.C. 154(b) by 817 days.

(21) Appl. No.: 16/912,210

(22) Filed: Jun. 25, 2020

(65) Prior Publication Data

US 2020/0407273 A1 Dec. 31, 2020

Related U.S. Application Data

(60) Provisional application No. 62/866,065, filed on Jun. 25, 2019.

(51) Int. Cl.
*C03C 21/00* (2006.01)
*C03C 3/087* (2006.01)

(52) U.S. Cl.
CPC ............ *C03C 21/002* (2013.01); *C03C 3/087* (2013.01); *C03C 2203/50* (2013.01); *C03C 2218/111* (2013.01)

(58) Field of Classification Search
USPC ........................................................ 60/30.14
See application file for complete search history.

(56) References Cited

U.S. PATENT DOCUMENTS

| | | | | |
|---|---|---|---|---|
| 3,628,934 A | * | 12/1971 | Duthoit | C03C 21/001 65/114 |
| 3,630,704 A | * | 12/1971 | Garfinkel | C03C 21/002 65/114 |
| 3,650,719 A | * | 3/1972 | Van Laethem | C03B 27/03 427/398.1 |
| RE27,921 E | * | 2/1974 | Duthoit | C03C 21/002 65/114 |
| 4,290,793 A | * | 9/1981 | Brockway | C03C 21/00 65/117 |
| 8,232,218 B2 | * | 7/2012 | Dejneka | C03B 27/04 501/68 |

(Continued)

FOREIGN PATENT DOCUMENTS

| | | | | |
|---|---|---|---|---|
| CN | 105683118 A | 6/2016 | | |
| JP | 2004161538 A | * 6/2004 | ........... | C03C 21/002 |

(Continued)

OTHER PUBLICATIONS

Gulati et al., "45.2:Two point bending of thin glass substrates," in SID Conf., 2011, pp. 652-654.

*Primary Examiner* — Jodi C Franklin

(57) ABSTRACT

Methods of manufacturing a glass-based article comprise: exposing an alkali-aluminosilicate glass-based substrate comprising opposing first and second surfaces defining a substrate thickness (t) to an ion exchange treatment to produce an ion exchanged glass-based substrate; and thereafter cooling the ion exchanged glass-based substrate in an environment having a starting temperature that is less than or equal to 200° C. and then reducing the temperature at a rate of greater than or equal to 3.3° C./minute to form the glass-based article.

21 Claims, 8 Drawing Sheets

(56)          References Cited

U.S. PATENT DOCUMENTS

| | | | | |
|---|---|---|---|---|
| 8,312,739 | B2 | 11/2012 | Lee et al. | |
| 8,561,429 | B2 | 10/2013 | Allan et al. | |
| 8,854,623 | B2 | 10/2014 | Fontaine et al. | |
| 9,321,677 | B2 | 4/2016 | Chang et al. | |
| 10,633,279 | B2 | 4/2020 | Gross et al. | |
| 11,370,702 | B2 * | 6/2022 | Fecher | A61K 6/833 |
| 2013/0004758 | A1 | 1/2013 | Dejneka et al. | |
| 2015/0079400 | A1 * | 3/2015 | Fu | C03C 3/091 |
| | | | | 65/95 |
| 2016/0083292 | A1 * | 3/2016 | Tabe | B65G 49/062 |
| | | | | 428/220 |
| 2016/0326051 | A1 * | 11/2016 | Kim | C03C 21/002 |
| 2016/0355431 | A1 * | 12/2016 | Akiba | C03C 3/087 |
| 2017/0107141 | A1 * | 4/2017 | Miyasaka | C03C 3/087 |
| 2017/0183258 | A1 * | 6/2017 | Ottermann | B65H 18/28 |
| 2017/0233287 | A1 * | 8/2017 | Li | C03C 3/068 |
| | | | | 428/172 |
| 2017/0305789 | A1 * | 10/2017 | Fujii | C03C 3/085 |
| 2017/0320769 | A1 * | 11/2017 | Guo | C03C 4/18 |
| 2018/0002216 | A1 * | 1/2018 | Ellison | C03B 25/093 |
| 2018/0072607 | A1 * | 3/2018 | Fujii | C03B 23/0252 |
| 2018/0148373 | A1 * | 5/2018 | Harris | B08B 9/42 |
| 2018/0251395 | A1 * | 9/2018 | Akiba | C03C 3/093 |
| 2018/0273425 | A1 * | 9/2018 | Mishiro | C09D 5/006 |
| 2019/0002332 | A1 * | 1/2019 | Saito | C03B 29/025 |
| 2019/0161386 | A1 | 5/2019 | Gross et al. | |
| 2019/0263713 | A1 * | 8/2019 | Murayama | C03C 3/091 |
| 2020/0103559 | A1 * | 4/2020 | Fujii | B32B 17/10 |
| 2020/0231496 | A1 * | 7/2020 | Inokuchi | B32B 17/06 |
| 2021/0323862 | A1 * | 10/2021 | Kanehara | C03C 4/02 |

FOREIGN PATENT DOCUMENTS

| | | | | | |
|---|---|---|---|---|---|
| JP | 2004161540 | A | * | 6/2004 | C03C 21/002 |
| JP | 2019199393 | A | * | 11/2019 | C03C 15/00 |
| KR | 102153318 | B1 | * | 9/2018 | C03C 21/002 |
| WO | 2009/108339 | A2 | | 9/2009 | |
| WO | 2014/066579 | A1 | | 5/2014 | |
| WO | 2017/192533 | A1 | | 11/2017 | |

* cited by examiner

Average Bend Strength (MPa) vs CS (MPa) Post-IOX

B10 Bend Strength (MPa) vs CS (MPa) Post-IOX

B90 Platen Spacing (mm) vs CS (MPa) Post-IOX

Average Platen Spacing (mm) vs CS (MPa) Post-IOX

METHODS OF COOLING GLASSES POST-ION EXCHANGE

CROSS-REFERENCE TO RELATED APPLICATION

This application claims the benefit of priority under 35 U.S.C. § 119 of U.S. Provisional Application Ser. No. 62/866,065 filed on Jun. 25, 2019, the content of which is relied upon and incorporated herein by reference in its entirety.

BACKGROUND

Field

The present specification generally relates to methods of cooling glasses post-ion exchange.

Technical Background

The mobile nature of portable devices, such as smart phones, smart watches, tablets, portable media players, personal computers, and cameras, makes these devices particularly vulnerable to accidental dropping on hard surfaces, such as the ground. These devices typically incorporate cover glasses, which may become damaged upon impact with hard surfaces. In many of these devices, the cover glasses function as display covers, and may incorporate touch functionality, such that use of the devices is negatively impacted when the cover glasses are damaged.

Flexible versions of products and components that are traditionally rigid in nature are being developed, for example, flexible displays. Optical transparency and thermal stability are often desirable properties for flexible display applications. In addition, flexible displays should have excellent strength properties, for example, high fatigue and puncture resistance, including resistance to failure at small bend radii, particularly for flexible displays that have touch screen functionality and/or can be folded. Generally, glass substrates can be manufactured to very low thickness levels (greater than or equal to 25 μm to less than or equal to 150 μm) to achieve smaller and smaller bend radii.

Chemical treatment is a strengthening method to impart a desired and/or engineered and/or improved stress profile having one or more of the following parameters: compressive stress (CS), depth of compression (DOC), depth of alkali metal oxide penetration, i.e., depth of layer (DOL) (for example potassium DOL, or $DOL_K$), and central tension (CT). Many glass-based articles, including those with engineered stress profiles, have a compressive stress that is highest or at a peak at the glass surface and reduces from a peak value moving away from the surface, and there is zero stress at some interior location (the DOC) of the glass article before the stress in the glass article becomes tensile. Chemical strengthening by ion exchange (IOX) of alkali-containing glass is one manner of strengthening glass in this field.

During ion exchange (IOX) strengthening, a glass-based substrate is brought into contact with a molten chemical salt so that an alkali metal of a relatively smaller ionic diameter in the glass-based substrate is ion-exchanged with an alkali metal of a relatively larger ionic diameter in the chemical salt, therefore generating compressive stress to strengthen the glass. IOX treatments are usually conducted in salt baths of temperatures in the range of about 360° C. to 500° C. After a time of IOX, resulting ion-exchanged substrates are cooled to a suitable handling temperature to form glass-based articles. Thereafter, the glass-based articles are incorporated into final products including but not limited to electronic devices. Post-ion exchange cooling is typically not designed into the process, rather it is typically a function of available equipment and process capability. The present inventors have found that when cooling processes are not controlled, some decrease in imparted strength may occur, as demonstrated by loss of CS and DOC along with reduction in $DOL_K$.

Thus, there is a need for methods to cool glasses in a controlled way to allow for minimizing loss of strength imparted during IOX and to allow for predictability of properties of cooled articles.

SUMMARY

Aspects of the disclosure pertain to methods of cooling glass-based substrates post-ion exchange.

In an aspect, a method of manufacturing a glass-based article comprises: exposing an alkali-aluminosilicate glass-based substrate comprising opposing first and second surfaces defining a substrate thickness (t) to an ion exchange treatment to produce an ion exchanged glass-based substrate; and thereafter exposing the ion exchanged glass-based substrate to a cooling environment, wherein the cooling environment comprises a starting temperature that is less than or equal to 200° C. and then reducing the starting temperature at a rate of greater than or equal to 3.3° C./minute; wherein upon cooling for a cooling duration, the glass-based article is obtained.

In another aspect, glass-based articles are made in accordance with any method herein.

Another aspect includes a consumer electronic product comprising: a housing comprising a front surface, a back surface, and side surfaces; electrical components at least partially within the housing, the electrical components comprising at least a controller, a memory, and a display, the display at or adjacent the front surface of the housing; and a cover disposed over the display; wherein a portion of at least one of the housing and the cover comprises any glass-based article disclosed herein.

According to Aspect 1, there is a method of manufacturing a glass-based article comprising:

exposing an alkali-aluminosilicate glass-based substrate comprising opposing first and second surfaces defining a substrate thickness (t) to an ion exchange treatment to produce an ion exchanged glass-based substrate; and thereafter exposing the ion exchanged glass-based substrate to a cooling environment, wherein the cooling environment comprises a starting temperature that is less than or equal to 200° C. and thereafter reducing the starting temperature at a rate of greater than or equal to 3.3° C./minute;

wherein upon cooling for a cooling duration, the glass-based article is obtained.

According to Aspect 2. The method of the preceding aspect, wherein the rate is greater than or equal to 6.0° C./minute.

According to Aspect 3. The method of any preceding aspect, wherein the substrate thickness (t) is greater than or equal to 25 micrometers and less than or equal to 125 micrometers.

According to Aspect 4. The method of aspect 1, wherein the ion exchange treatment and the cooling are conducted in a vessel that defines a reservoir, a head space, a movable partition to separate the reservoir and the head space, and a vent in fluid communication with the head space.

According to Aspect 5. The method of aspect 4, wherein: the ion exchange treatment comprises:

moving the movable partition to a first position such that the reservoir is in fluid communication with the head space;

immersing the alkali-aluminosilicate glass-based substrate in a molten salt bath disposed in the reservoir for a treatment duration;

obtaining an ion exchanged glass-based substrate after the treatment duration;

moving the movable partition to the first position and withdrawing the ion exchanged glass-based substrate from the molten salt bath; and holding the ion exchanged glass-based substrate in the head space above the molten salt bath for a drip duration; and the cooling comprises:

moving the movable partition to a second position that separates the reservoir and the head space;

setting the temperature of the head space to less than or equal to 200° C.; and cooling the head space at the rate of greater than or equal to 3.3° C./minute.

According to Aspect 6. The method of aspect 5, wherein the molten salt bath is at a temperature in the range of greater than or equal to 360° C. to less than or equal to 500° C.

According to Aspect 7. The method of any preceding aspect, wherein the cooling duration is less than or equal to 60 minutes.

According to Aspect 8. The method of the preceding aspect, wherein the cooling duration is less than or equal to 30 minutes.

According to Aspect 9. The method of any preceding aspect, wherein the cooling is conducted until the environment in the head space is at a temperature of less than or equal to 70° C.

According to Aspect 10. The method of any preceding aspect, wherein the cooling is conducted until the environment or the head space is at a temperature in the range of greater than or equal to 50° C. to less than or equal to 70° C.

According to Aspect 11. The method of any preceding aspect, wherein the glass-based substrate is lithium-free.

According to Aspect 12. The method of any preceding aspect, wherein the glass-based substrate comprises in mole percentages: 66-70% $SiO_2$, 9-12% $Al_2O_3$, 14-16% $Na_2O$, 4.5-5.5% $MgO$, 0.01-0.09% $CaO$, and 0.10-0.20% $SnO$.

According to Aspect 13. The method of any preceding aspect wherein the glass-based substrate comprises in mole percentages ±0.5%: 69% $SiO_2$, 10% $Al_2O_3$, 15% $Na_2O$, 5% $MgO$, 0.1% $CaO$, and 0.2% $SnO$.

According to Aspect 14. A glass-based article made in accordance with any preceding aspect.

According to Aspect 15. The glass-based article of aspect 14 comprising a maximum compressive stress ($CS_{max}$) of greater than or equal to 750 MPa.

According to Aspect 16. The glass-based article of aspect 14 comprising a depth of layer ($DOL_K$) with respect to potassium of greater than or equal to 0.19·t micrometers.

According to Aspect 17. The glass-based article of aspect 14 comprising a maximum compressive stress ($CS_{max}$) of greater than or equal to 750 MPa and a depth of layer ($DOL_K$) of greater than or equal to 0.19·t.

According to Aspect 18. A consumer electronic product comprising:

a housing comprising a front surface, a back surface, and side surfaces;

electrical components at least partially within the housing, the electrical components comprising at least a controller, a memory, and a display, the display at or adjacent the front surface of the housing; and a cover disposed over the display;

wherein a portion of at least one of the housing and the cover comprises the glass-based article of any of aspects 14 to 17.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
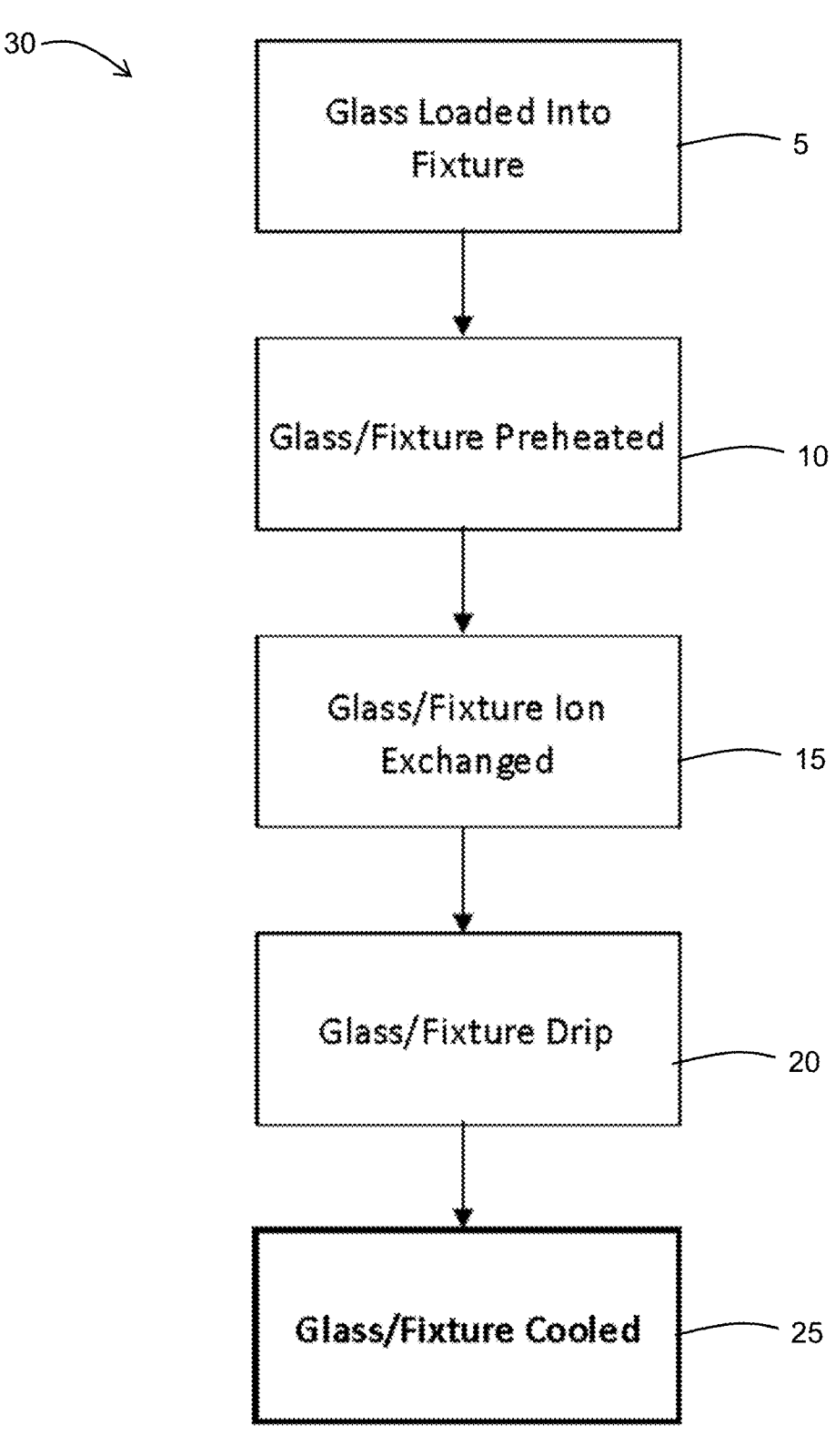
FIG. 1 is a flow chart of an exemplary process according to an embodiment.

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment, or to only one embodiment. Furthermore, the particular features, structures, materials, or characteristics may be combined in any suitable manner in one or more embodiments.

Definitions and Measurement Techniques

The terms "glass-based article" and "glass-based substrates" are used to include any object made wholly or partly of glass, including glass-ceramics (including an amorphous phase and a crystalline phase). Laminated glass-based articles include laminates of glass and non-glass materials, laminates of glass and crystalline materials. Glass-based substrates according to one or more embodiments can be selected from soda-lime silicate glass, alkali-alumino silicate glass, alkali-containing borosilicate glass, alkali-containing aluminoborosilicate glass, and alkali-containing glass-ceramics.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

Unless otherwise specified, all compositions described herein are expressed in terms of mole percent (mol %) on an oxide basis.

A "stress profile" is stress as a function of thickness across a glass-based article. A compressive stress region extends from a first surface to a depth of compression (DOC) of the article, where the article is under compressive stress. A central tension region extends from the DOC to include the region where the article is under tensile stress.

As used herein, depth of compression (DOC) refers to the depth at which the stress within the glass-based article changes from compressive to tensile stress. At the DOC, the stress crosses from a negative (compressive) stress to a positive (tensile) stress and thus exhibits a stress value of zero. According to the convention normally used in mechanical arts, compression is expressed as a negative (<0) stress and tension is expressed as a positive (>0) stress. Throughout this description, however, values compressive stress (CS) are expressed as a positive or absolute value—i.e., as recited herein, CS=|CS|. Additionally, values of tensile stress or central tension (CT) may be expressed as an absolute value, i.e., CT=|CT|. Central tension (CT) refers to tensile stress in a central region or a central tension region of the glass-based article. Maximum central tension (maximum CT or $CT_{max}$) occurs in the central tension region (in some embodiments at 0.5·t, where t is the article thickness), which allows for variation from exact center of the location of the maximum tensile stress. Peak tension (PT) refers to maximum tension measured, which may or may not be at the center of the article.

A non-zero metal oxide concentration that varies from the first surface to a depth of layer (DOL) with respect to the metal oxide or that varies along at least a substantial portion of the article thickness (t) indicates that a stress has been generated in the article as a result of ion exchange. The variation in metal oxide concentration may be referred to herein as a metal oxide concentration gradient. The metal oxide that is non-zero in concentration and varies from the first surface to a DOL or along a portion of the thickness may be described as generating a stress in the glass-based article. The concentration gradient or variation of metal oxides is created by chemically strengthening a glass-based substrate in which a plurality of first metal ions in the glass-based substrate is exchanged with a plurality of second metal ions. The metal oxide concentration may include that of only one metal oxide, or may include that of a plurality of metal oxides.

As used herein, the terms "depth of exchange", "depth of layer" (DOL), "chemical depth of layer", and "depth of chemical layer" may be used interchangeably, describing in general the depth at which ion exchange facilitated by an ion exchange process (IOX) takes place for a particular ion. DOL refers to the depth within a glass-based article (i.e., the distance from a surface of the glass-based article to its interior region) at which an ion of a metal oxide or alkali metal oxide (e.g., the metal ion or alkali metal ion) diffuses into the glass-based article where the concentration of the ion reaches a minimum value, as determined by Glow Discharge-Optical Emission Spectroscopy (GD-OES)). In some embodiments, the DOL is given as the depth of exchange of the slowest-diffusing or largest ion introduced by an ion exchange (IOX) process. DOL with respect to potassium ($DOL_K$) is the depth at which the potassium content of the glass article reaches the potassium content of the underlying substrate.

Unless otherwise specified, CT and CS are expressed herein in megapascals (MPa), thickness is express in millimeters (mm) and DOC and DOL are expressed in microns (micrometers, or μm).

Compressive stress (including surface and/or peak CS, $CS_{max}$) and $DOL_K$ are measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The maximum central tension (CT) or peak tension (PT) and stress retention values are measured using a scattered light polariscope (SCALP) technique known in the art. The Refracted near-field (RNF) method or SCALP may be used to measure the stress profile and the depth of compression (DOC). When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

Ion Exchange (IOX) Treatment and Post-IOX Cooling

The present disclosure provides post-ion exchange cooling processes to reduce compressive stress (CS) losses and changes in depth of layer (e.g., $DOL_K$). CS and DOL are related during ion exchange: as one increases, the other decreases. High compressive stresses lead to achieving tight bend radii for ultra-thin flexible and/or bendable glass. Controlled cooling provides stability in surface strength results and/or CS (repeatable and reproducible) when compared to environmental-dependent or uncontrolled cooling. Exemplary glass substrates and articles that are amenable to this type of processing include but are not limited to those of U.S. Pat. No. 9,321,677 to common assignee, hereby incorporated by reference.

Without intending to be bound by theory, it is thought that one reason compressive stress could decrease during cooling is continued ion exchange at temperatures where the IOX salts are still diffusing. For example, continued ion exchange could still occur at temperatures of greater than or equal to 360° C.

Also without intending to be bound by theory, another reason compressive stress could decrease during cooling is stress relaxation, which can occur at temperatures of greater than 200° C. Stress relaxation is dependent on temperature and the time of exposure at that temperature.

Slower cooling rates that start at temperatures above 360° C. can combine effects (additional ion exchange and relaxation), or cause stress relaxation during slow cooling. Comparative processes using ambient cooling or uncontrolled cooling resulted in significant compressive stress reduction, which can impact bend strength. By controlling the cooling rate, compressive stress and depth of layer can be controlled to improve ultra-thin bendable glass performance. Data herein shows what impact the cooling rate has on: compressive stress, depth of layer, and bend strength.

Post-ion exchange cooling rate and cooling start temperature can impact the stress profile in ultra-thin bendable glass. A modified stress profile can impact the bend performance (strength, radius). Faster cooling rates and lower cooling start temperatures preserved CS and resulted in excellent bend performance. Post-ion exchange cooling can be modified to generate a preferred stress profile based on needed CS and/or DOL.

Figure 2:
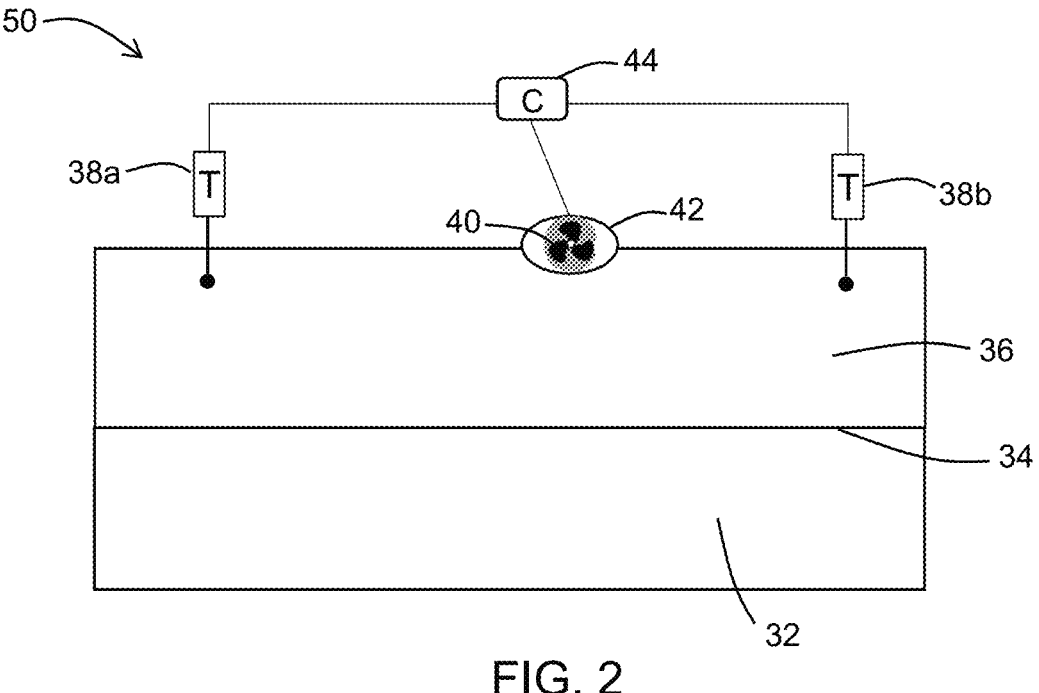
FIG. 2 schematically depicts a vessel with venting for ion exchange and cooling according to an embodiment.

FIGS. 1-2 provide, respectively, a flow chart of an exemplary process and a schematic depiction of an exemplary vessel for conducting ion exchange and controlled cooling, respectively. The exemplary process 30 takes place in a vessel 50. At 5, a glass, for example, a plurality of glass-based substrates, is loaded into a fixture. At 10, the glass and/or fixture is preheated in the head space 36. At 15, a lid or partition 34 moves to a first position (open), and the fixture is immersed into a reservoir 32 containing a molten salt bath for ion exchange, whose temperature is set at a desired ion exchange temperature. The partition 34 moves to a second position (closed) once the fixture is immersed. After a time for ion exchange elapses, the partition 34 moves back to the first position (open) and the fixture is extracted out of the molten salt bath, and at 20 the glass and/or fixture drips back into the reservoir 32 for a drip time. Drip time is a prescribed delay time after fixture extraction from the reservoir before cooling begins, which allows salt to drip off the glass and fixture back into the reservoir. During this drip time, the reservoir remains open and the glass is exposed to the ambient heat. After the drip time, the partition 34 moves to the second position (closed), which separates and/or seals the reservoir 32 from the head space 36. The head space 36 contains an air driven fan 40 located in a vent 42, and multiple thermocouples, for example, 38a and 38b. A controller "C" 44 communicates with the thermocouples and the fan 40. Cooling in the head space is controlled by the controller in communication with the thermocouples. Cooling is conducted to achieve an environment temperature of 60° C.±10° C. (e.g., 50° C. to 70° C.) or 60° C.±5° C. (e.g., 55° C. to 75° C.), including all values and subranges therebetween, which in turn results in a glass-based article of approximately the same temperature for handling.

In one or more embodiments, a method of manufacturing a glass-based article comprises: exposing an alkali-aluminosilicate glass-based substrate comprising opposing first and second surfaces defining a substrate thickness (t) to an ion exchange treatment to produce an ion exchanged glass-based substrate; and thereafter cooling the ion exchanged glass-based substrate in a cooling environment, wherein the cooling environment comprises a starting temperature that is less than or equal to 200° C.; and controlling the cooling, for example with a controller that is programmed to do so, to reduce the starting temperature at a rate of greater than or equal to 3.3° C./minute. Upon cooling for a cooling duration, the glass-based article is obtained. After cooling, the glass-based article may be further processed, for example, it may be etched. Etching results in a slightly thinner thickness article. Etching after IOX assists ultra-thin articles to recover bend strength. Herein, glass-based articles refer to glasses post-IOX and post-cooling, etched or not etched.

The cooling rate may be greater than or equal to 3.3° C./minute, for example, greater than or equal to 3.5° C./minute, greater than or equal to 4.0° C./minute, greater than or equal to 4.5° C./minute, greater than or equal to 5.0° C./minute, greater than or equal to 5.5° C./minute, greater than or equal to 6.0° C./minute, greater than or equal to 6.5° C./minute, greater than or equal to 7.0° C./minute, greater than or equal to 7.5° C./minute, greater than or equal to 8.0° C./minute, greater than or equal to 8.5° C./minute, greater than or equal to 9.0° C./minute, greater than or equal to 9.5° C./minute, or greater than or equal to 10.0° C./minute, and all values and subranges therebetween. An upper limit on cooling rate would be equipment-specific but generally the cooling rate is less than or equal to 25° C./minute.

In an embodiment, the ion exchange treatment and the cooling are conducted in a vessel that defines a reservoir, a head space, a movable partition to separate the reservoir and the head space, and a vent in fluid communication with the head space.

In an embodiment, the ion exchange treatment comprises: moving the movable partition to a first position such that the reservoir is in fluid communication with the head space; immersing the alkali-aluminosilicate glass-based substrate in a molten salt bath disposed in the reservoir for a treatment duration; moving the movable partition to a second position that closes off the reservoir from the head space; obtaining an ion exchanged glass-based substrate after the treatment duration; moving the movable partition to the first position and withdrawing the ion exchanged glass-based substrate from the molten salt bath; and holding the ion exchanged glass-based substrate in the head space above the molten salt bath for a drip duration.

In an embodiment, the cooling comprises: moving the movable partition to a second position that separates the reservoir and the head space; setting the temperature of the head space to less than or equal to 200° C.; and cooling the head space at the rate of greater than or equal to 3.3° C./minute.

In an embodiment, the molten salt bath is at a temperature in the range of greater than or equal to 360° C. to less than or equal to 500° C., and all values and subranges therebetween.

In an embodiment, the cooling duration is less than or equal to 60 minutes, less than or equal to 30 minutes, or less than or equal to 10 minutes, or less than or equal to 5 minutes.

In an embodiment, the cooling is conducted until the environment or the head space is at a temperature of less than or equal to 70° C. Also in an embodiment, the cooling is conducted until the environment or the head space is at a temperature in the range of greater than or equal to 50° C. to less than or equal to 70° C.

In some embodiments, chemical strengthening of glass substrates having base compositions is done by placing the ion-exchangeable glass substrates in a molten bath containing cations (e.g., K+, Na+, Ag+, etc.) that diffuse into the glass while the smaller alkali ions (e.g., Na+, Li+) of the glass diffuse out into the molten bath. The replacement of the smaller cations by larger ones creates compressive stresses near the top surface of glass, and to a depth within the glass. Tensile stresses are generated in the interior of the glass to balance the compressive stresses.

Ion exchange processes may also include, independently, a thermal-diffusion process or an electro-diffusion process. Non-limiting examples of ion exchange processes in which glass is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath that is diluted with an effluent ion, followed by immersion in a second bath having a smaller concentration of the effluent ion than the first bath. The contents of U.S. Pat. Nos. 8,561,429 and 8,312,739 are incorporated herein by reference in their entireties.

After an ion exchange process is performed, it should be understood that a composition at the surface of a glass article may be different than the composition of the as-formed glass substrate (i.e., the glass substrate before it undergoes an ion exchange process). This results from one type of alkali metal ion in the as-formed glass, such as, for example $Li^+$ or Na+, being replaced with larger alkali metal ions, such as, for example $Na^+$ or $K^+$, respectively.

General Overview of Properties of Glass-Based Articles

Figure 3:
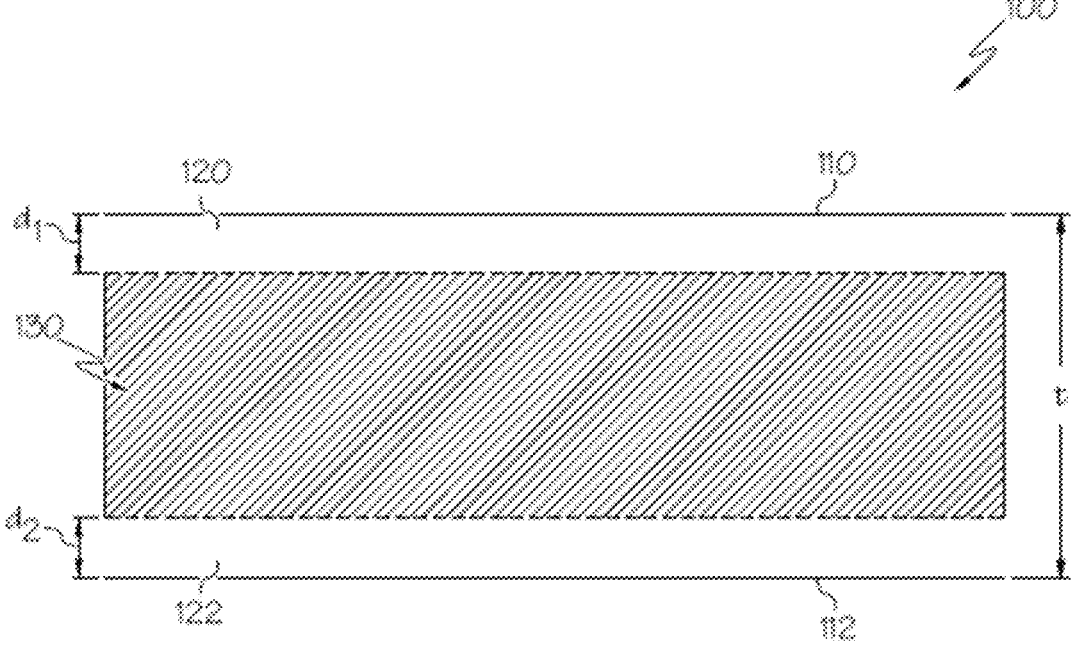
FIG. 3 is a schematic representation of a glass-based article according to an embodiment.

With reference to FIG. 3, the glass-based articles have a first region under compressive stress, e.g., first and second compressive stress layers 120, 122, extending from the surface to a depth of compression (DOC) of the glass and a second region, e.g., central region 130 under a tensile stress or central tension (CT) extending from the DOC into the central or interior region of the glass.

The compressive stress (CS) has a maximum or peak value, which typically occurs at the surface of the glass (but such need not be the case as the peak may occur at a depth from the surface of the glass), and the CS varies with distance d from the surface according to a function. Referring again to FIG. 3, the first compressive stress layer 120 extends from first surface 110 to a depth $d_1$ and a second compressive stress layer 122 extends from second surface 112 to a depth $d_2$. Together, these segments define zones of compression of glass 100.

The compressive stresses in the zones of compression are balanced by stored tension in the central region 130 of the glass.

In the glass-based articles, there is an alkali metal oxide having a non-zero concentration that varies from one or both of first and second surfaces to a depth of layer (DOL) with respect to the metal oxide. A stress profile is generated due to the non-zero concentration of the metal oxide(s) that varies from the surface. The non-zero concentration may vary along a portion of the article thickness. In some embodiments, the concentration of the alkali metal oxide is non-zero and varies along a thickness range from about 0·t to about 0.3·t. In some embodiments, the concentration of the alkali metal oxide is non-zero and varies along a thickness range from about 0·t to about 0.35·t, from about 0·t to about 0.4·t, from about 0·t to about 0.45·t, from about 0·t to about 0.48·t, or from about 0·t to about 0.50·t. The variation in concentration may be continuous along the above-referenced thickness ranges. Variation in concentration may include a change in metal oxide concentration of about 0.2 mol % or more along a thickness segment of about 10 micrometers. The change in metal oxide concentration may be about 0.3 mol % or more, about 0.4 mol % or more, or about 0.5 mol % or more along a thickness segment of about 10 micrometers. This change may be measured by known methods in the art including microprobe.

In some embodiments, the variation in concentration may be continuous along thickness segments in the range from about 10 micrometers to about 30 micrometers, for example from about 10 microns to about 25 microns, or from about 10 microns to about 20 microns, or from about 10 microns to about 15 microns. In some embodiments, the concentration of the alkali metal oxide decreases from the first surface to a value at a point between the first surface and the second surface and then increases from the value to the second surface.

The concentration of alkali metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while at deeper depths, the concentration of ions having a smaller radius is greater than the concentration of ions having larger radius.

In one or more embodiments, the alkali metal oxide concentration gradient extends through a substantial portion of the thickness t of the article. In some embodiments, the concentration of the metal oxide may be about 0.5 mol % or greater (e.g., about 1 mol % or greater) along the entire thickness of the first and/or second section, and is greatest at a first surface and/or a second surface (i.e., at 0·t and/or t) and decreases substantially constantly to a value at a point between the first and second surfaces. At that value, the concentration of the metal oxide is the least along the entire thickness t; however the concentration is also non-zero at that point. In other words, the non-zero concentration of that particular metal oxide extends along a substantial portion of the thickness t (as described herein) or the entire thickness t. The total concentration of the particular metal oxide in the glass-based article may be in the range from about 1 mol % to about 20 mol %.

The concentration of the alkali metal oxide may be determined from a baseline amount of the metal oxide in the glass-based substrate prior to being ion exchanged to form the glass-based article.

In one or more embodiments, the glass-based article comprises a thickness in the range of 25 micrometers to 125 micrometers, and all values and subranges therebetween; and/or the thickness is 100 micrometers or less, 75 micrometers or less, 80 micrometers or less, 50 micrometers or less.

In one or more embodiments, the glass-based article comprises a maximum compressive stress $CS_{max}$ of greater than or equal to 750 MPa, for example, greater than or equal to 780 MPa, greater than or equal to 800 MPa, greater than or equal to 850 MPa, or greater than or equal to 900 MPa.

In one or more embodiments, the glass-based article comprises a $DOL_K$ that is greater than or equal to 0.19·t, 0.195·t, 0.20·t, 0.205·t, 0.21·t, and/or less than or equal to 0.25t, or 0.24t, including all values and subranges therebetween.

Glass-Based Articles—Modelled

Tables A and B provide a summary of characteristics of IOX' d glasses as determined by a mechanical model for post-IOX and/or post-Etch. For the purposes of the model, substrates were thinned from 200 μm to 50 μm or 75 μm or 100 μm. In Table B, CT is estimated using a "Triangle" approximation method, which assumes that the area under the compressive stress curve forms a triangle at each surface of the glass-based article and sets CT according to that area, or a "Physics" method, which uses a physics calculation based on integrating the actual area under the compressive stress curve and setting the CT based on that area. The triangle approximation is generally suitable for ion exchanges of shallow penetration, those based on potassium for sodium in non-lithium containing glasses, and the like where the compressive stress profile no longer resembles a triangular region. The Physics method is more suitable when the compressive stress curve does not resemble a triangle as in the case of deeper penetrations and for lithium containing glasses.

TABLE A

| Thick (μm) | Condition | IOX Time (min) | IOX Temp (° C.) | Modelled CS (MPa) | Modelled $DOL_K$ (μm) |
|---|---|---|---|---|---|
| 50 | Post-IOX | 20 | 410 | 878 | 9.6 |
| 50 | Post-Etch | 20 | 410 | 703 | 8.7 |
| 75 | Post-IOX | 45 | 410 | 875 | 14.3 |
| 75 | Post-Etch | 45 | 410 | 759 | 13.4 |
| 100 | Post-IOX | 60 | 410 | 896 | 16.5 |
| 100 | Post-Etch | 60 | 410 | 792 | 15.6 |

TABLE B

| Thick (μm) | Condition | CT (Triangle) | CT (Physics) | DOC (μm) |
|---|---|---|---|---|
| 50 | Post-IOX | 273 | 163 | 7.0 |
| 50 | Post-Etch | 188 | 121 | 6.4 |
| 75 | Post-IOX | 270 | 162 | 10.4 |
| 75 | Post-Etch | 211 | 133 | 9.8 |
| 100 | Post-IOX | 220 | 140 | 12.6 |
| 100 | Post-Etch | 179 | 117 | 12.1 |

Glass-Based Substrates

Examples of glasses that may be used as substrates may include soda-lime silicate compositions, alkali-alumino silicate glass compositions or alkali-containing aluminoborosilicate glass compositions, though other glass compositions are contemplated. Specific examples of glass-based substrates that may be used include but are not limited to a soda-lime silicate glass, an alkali-alumino silicate glass, an alkali-containing borosilicate glass, an alkali-alumino borosilicate glass, an alkali-containing lithium alumino silicate glass, or an alkali-containing phosphate glass. Optionally, the glass-based substrates have base compositions that may be characterized as ion exchangeable. As used herein, "ion exchangeable" means that a substrate comprising the composition is capable of exchanging cations located at or near the surface of the substrate with cations of the same valence that are either larger or smaller in size.

In an embodiment, the glass-based substrate is lithium-free. In an embodiment, the glass-based substrate comprises in mole percentages: 66-70% $SiO_2$, 9-12% $Al_2O_3$, 14-16% $Na_2O$, 4.5-5.5% MgO, 0.01-0.09% CaO, and 0.10-0.20% SnO. In an embodiment, the glass-based substrate comprises in mole percentages ±0.5%: 69% $SiO_2$, 10% $Al_2O_3$, 15% $Na_2O$, 5% MgO, 0.1% CaO, and 0.2% SnO. In other embodiments, the glass-based substrate may contain lithium.

In embodiments, the glass-based substrates may be formed from any composition capable of producing the stress profiles. In some embodiments, the glass-based substrates may be formed from the glass compositions described in U.S. application Ser. No. 16/202,691 titled "Glasses with Low Excess Modifier Content," filed Nov. 28, 2018, the entirety of which is incorporated herein by reference. In some embodiments, the glass articles may be formed from the glass compositions described in U.S. application Ser. No. 16/202,767 titled "Ion-Exchangeable Mixed Alkali Aluminosilicate Glasses," filed Nov. 28, 2018, the entirety of which is incorporated herein by reference.

The glass-based substrates may be characterized by the manner in which it may be formed. For instance, the glass-based substrates may be characterized as float-formable (for example, formed by a float process), down-drawable and, in particular, fusion-formable or slot-drawable (for example, formed by a down draw process such as a fusion draw process or a slot draw process).

Some embodiments of the glass-based substrates described herein may be formed by a down-draw process. Down-draw processes produce glass-based substrates having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Some embodiments of the glass-based substrates may be described as fusion-formable (for example, formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass-based substrates described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot and/or nozzle and is drawn downward as a continuous glass article and into an annealing region.

In one or more embodiments, the glass-based substrates described herein may exhibit an amorphous microstructure and may be substantially free of crystals or crystallites. In other words, the glass-base substrates articles exclude glass-ceramic materials in some embodiments.

In embodiments of glass compositions described herein, the concentration of constituent components (e.g., $SiO_2$, $Al_2O_3$, $Li_2O$, and the like) are given in mole percent (mol %) on an oxide basis, unless otherwise specified. It should be understood that any of the variously recited ranges of one component may be individually combined with any of the variously recited ranges for any other component.

In one or more embodiments, the glass-based substrate comprises a thickness t in the range of the glass-based article comprises a thickness in the range of 25 micrometers to 125 micrometers, and all values and subranges therebetween; and/or the thickness is 100 micrometers or less, 75 micrometers or less, 80 micrometers or less, 50 micrometers or less.

End Products

Figure 4A:
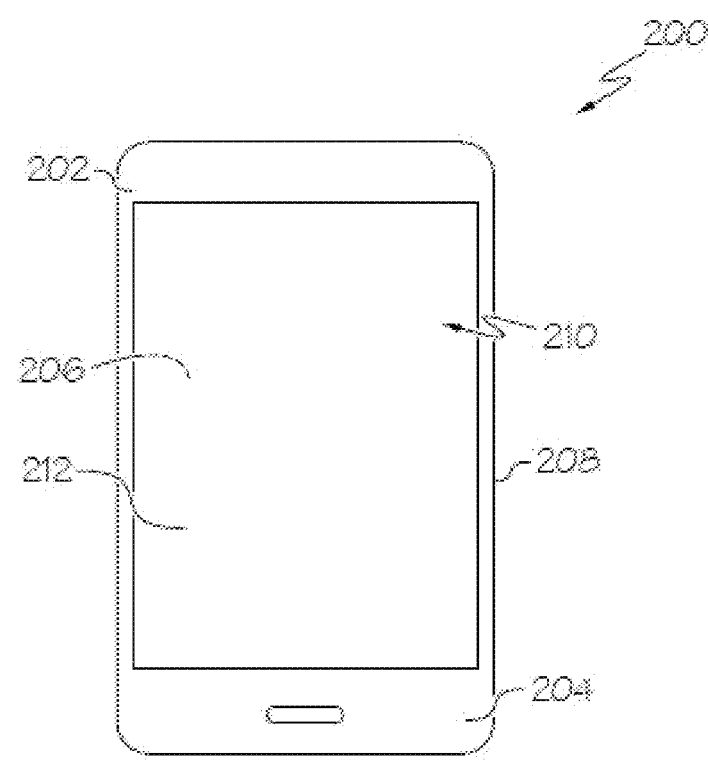
FIG. 4A is a plan view of an exemplary electronic device incorporating any of the glass articles disclosed herein.
Figure 4B:
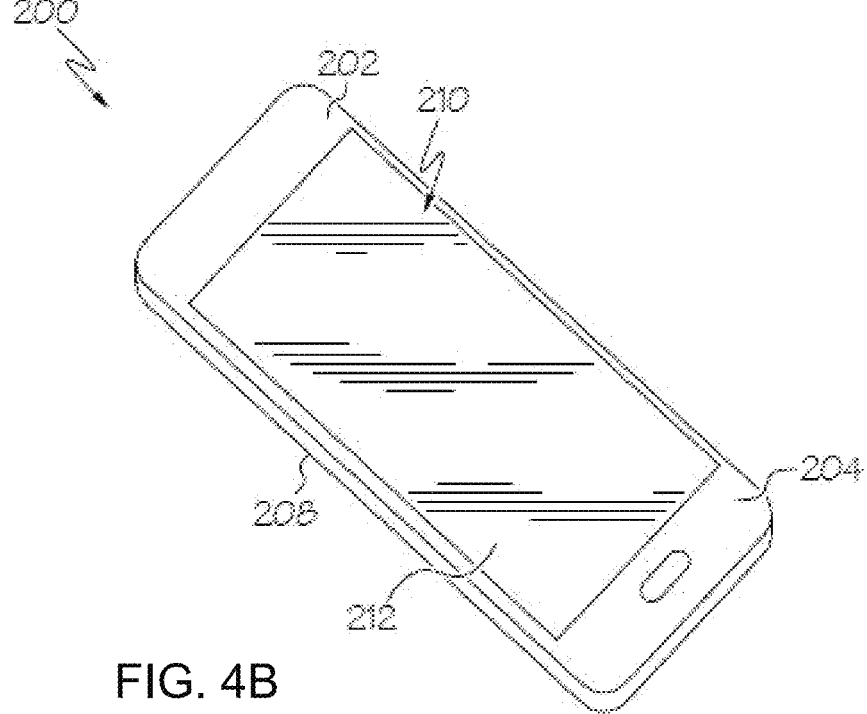
FIG. 4B is a perspective view of the exemplary electronic device of FIG. 4A.

The glass-based articles disclosed herein may be incorporated into another article such as an article with a display (or display articles) (e.g., consumer electronics, including mobile phones, smart watches, tablets, computers, navigation systems, and the like), architectural articles, transportation articles (e.g., automobiles, trains, aircraft, sea craft, etc.), appliance articles, or any article that would benefit from some transparency, scratch-resistance, abrasion resistance or a combination thereof. An exemplary article incorporating any of the glass articles disclosed herein is shown in FIGS. 4A and 4B. Specifically, FIGS. 4A and 4B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, the cover substrate 212 may include any of the glass articles disclosed herein.

EXAMPLES

Embodiments will be further clarified by the following examples. It should be understood that these examples are not limiting to the embodiments described above.

Fusion-drawn glass sheets comprised a non-lithium alkali aluminosilicate composition according to Composition A comprising (±0.5 mol %): 69% $SiO_2$, 10% $Al_2O_3$, 15% $Na_2O$, 5% MgO, 0.1% CaO, and 0.2% SnO. The glass sheets were 0.55 millimeters (mm) thick.

The glass sheets were then cut and thinned into shapes having starting dimensions of 180 mm×105.2 mm×0.2 mm and finished edges. Next, the shapes were chemically thinned to a desired thickness (ranging from 55 to 100 micrometers (µm)) to form glass substrates. Glass substrates are transported in a fixture, 8 at a time. The glass substrates were washed prior to an ion exchange. Ion exchange was conducted in a reservoir and the exchange bath conditions were: 100% $KNO_3$ molten salt bath with 0.5% silicic acid added at 410° C. for a time of 45 minutes. After the IOX time, the fixture holding the substrates was lifted out of the bath and allowed to drip for a drip time in a head space above the reservoir. Drip time was the prescribed delay time after fixture extraction from the bath before cooling begins that allows the salt to drip off the glass and fixture back into the tank. During this time, the reservoir remains open and the glass is exposed to the ambient heat, including heat from the bath in the reservoir.

Once the specified drip time ended, a lid closed, separating the reservoir from the head space, and cooling began. For all conditions, preheat and ion exchange conditions of time and temperature were held constant. Various cooling methods were tested to bring the ion exchanged substrate to a handling temperature of approximately 60° C. (±10° C.) to form the glass-based article. Temperature measurements reported in the following examples are of the head space where the substrates were cooled. Glass articles were thereafter etched to remove ~1-2 micrometers from each major surface. In the examples, some measurements are reported based on the post-IOX and/or pre-etched articles and some are for post-etched articles.

Example 1

Figure 5:
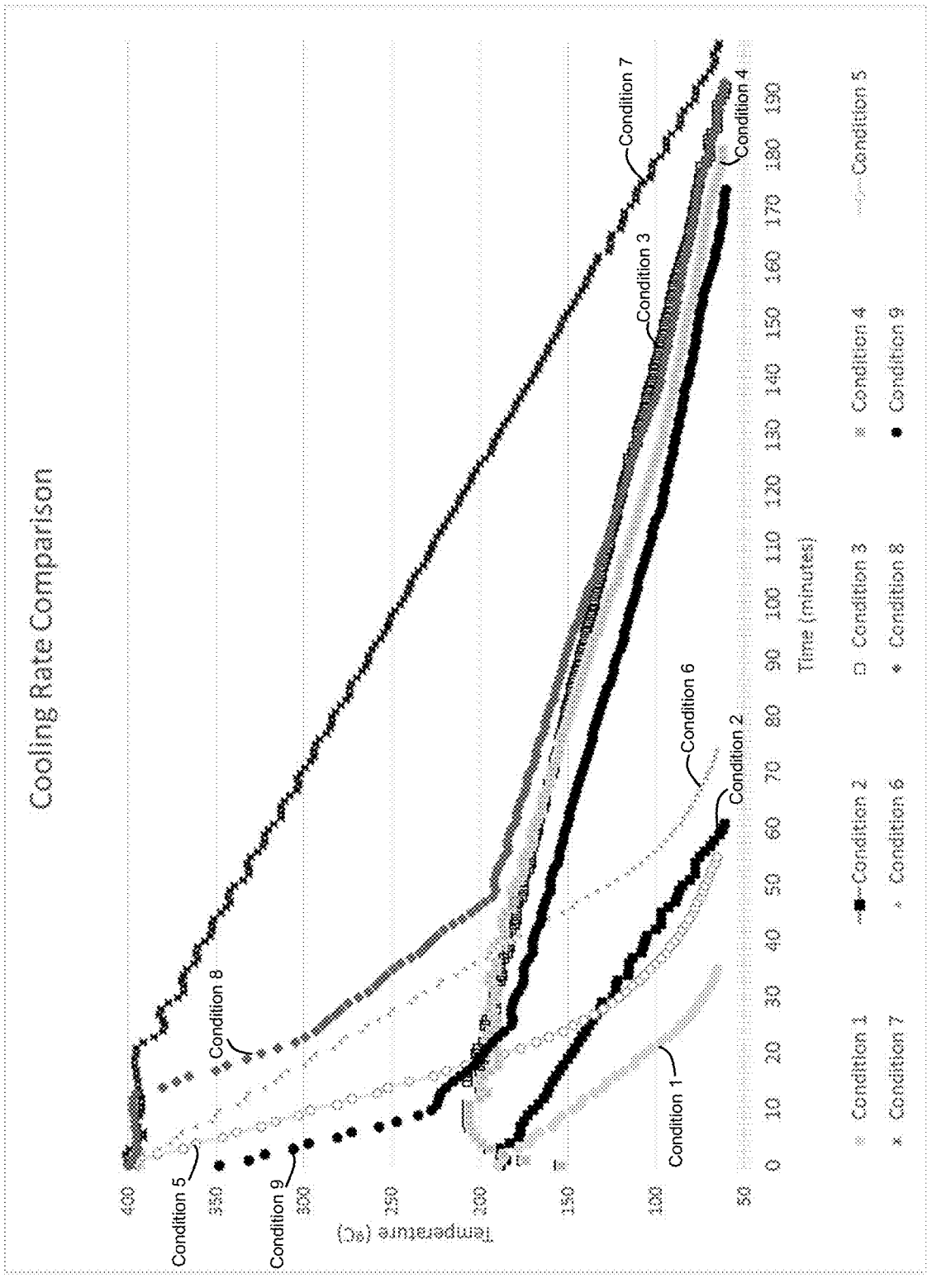
FIG. 5 is a graph of temperature versus time for Conditions 1-9 of Example 1.

Substrates were chemically thinned to 75 micrometers (µm). Cooling was conducted in a vessel with venting, in the head space above a closed-off ion exchange bath, where temperature of the head space was measured by a thermocouple and controlled with a programmable controller for controlled cooling. Forced cooling was driven by venting and air fan. Conditions 1-9 were tested as set forth in Tables 1-3, which reflect the programmed cooling. FIG. 5 shows the measured temperature versus time for Conditions 1-9. For each condition, 8 samples were processed. The "Stepped" cooling rates indicated in Table 1 are set forth in more detail in Table 2 (Stepped-1) and Table 3 (Stepped-2), wherein "Stepped-1*" indicates that during the time range of 1 to 24 minutes in the Stepped-1 cooling rate table, a rate of 0.25° C. per minute was used, whereas "Stepped-1**" indicates that during the time range of 1 to 24 minutes in the Stepped-1 cooling rate table, a rate of 8.6° C. per minute was used. In Tables 2 and 3, the "Cooling time" is the time in minutes for each time range interval.

TABLE 1

| Condition | Drip Time (min) | Start Temp (° C.) | Cooling time (min) | Cooling Rate (° C. per min) |
|---|---|---|---|---|
| 1 | 1 | 200 | 30 | 6.6 |
| 2 | 1 | 200 | 60 | 3.3 |
| 3 | 10 | 200 | 170 | 1.1 |
| 4 | 10 | 200 | 170 | Stepped-1* |
| 5 | 1 | 400 | 30 | 6.6 |
| 6 | 1 | 400 | 60 | 3.3 |
| 7 | 10 | 400 | 170 | 1.1 |
| 8 | 10 | 400 | 170 | Stepped-1** |
| 9 | 10 | 250 | 170 | Stepped-2 |

TABLE 2

| | Stepped-1 | | |
|---|---|---|---|
| Time Range (min) | Temperature Range (° C.) | Cooling time (min) | Cooling Rate (° C. per min) |
| 1-24 | Start-194 | 24 | 0.25*, 8.6** |
| 25-64 | 194-154 | 40 | 1.0 |
| 65-114 | 154-99 | 50 | 1.1 |
| 115-170 | 99-60 | 56 | 0.7 |

TABLE 3

| | Stepped-2 | | |
|---|---|---|---|
| Time Range (min) | Temperature Range (° C.) | Cooling time (min) | Cooling Rate (° C. per min) |
| 1-10 | Start-230 | 10 | 2.0 |
| 11-24 | 230-184 | 14 | 3.3 |
| 25-64 | 184-147 | 40 | 0.9 |
| 65-114 | 147-99 | 50 | 1.0 |
| 115-170 | 99-60 | 56 | 0.7 |

Figure 6:
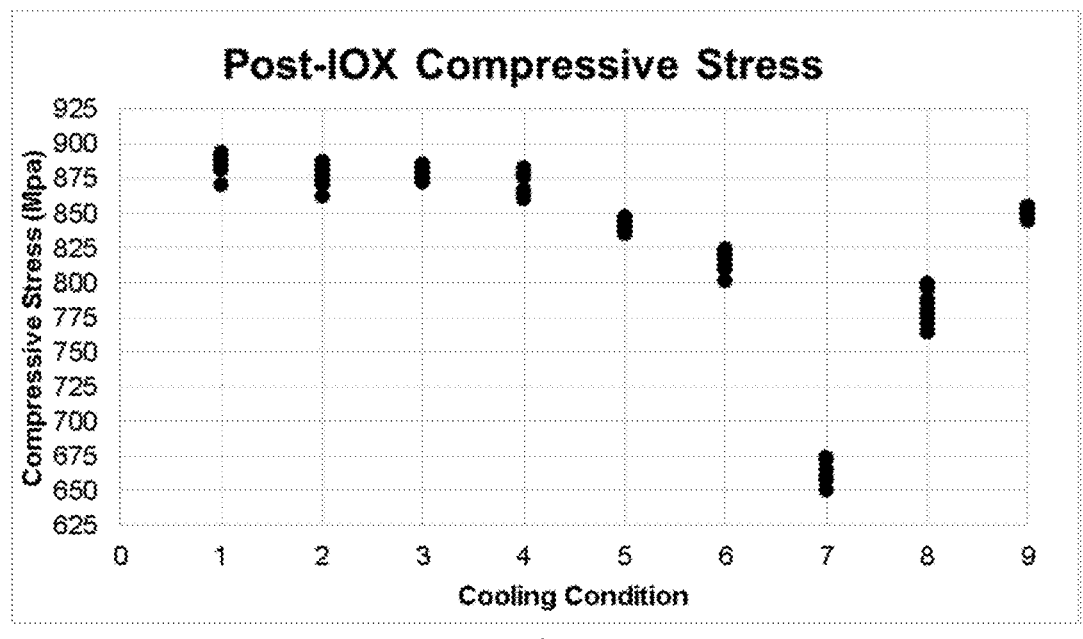
FIG. 6 is a graph showing compressive stress (MPa) (post-IOX and/or pre-etch) versus cooling condition for Example 1.
Figure 7:
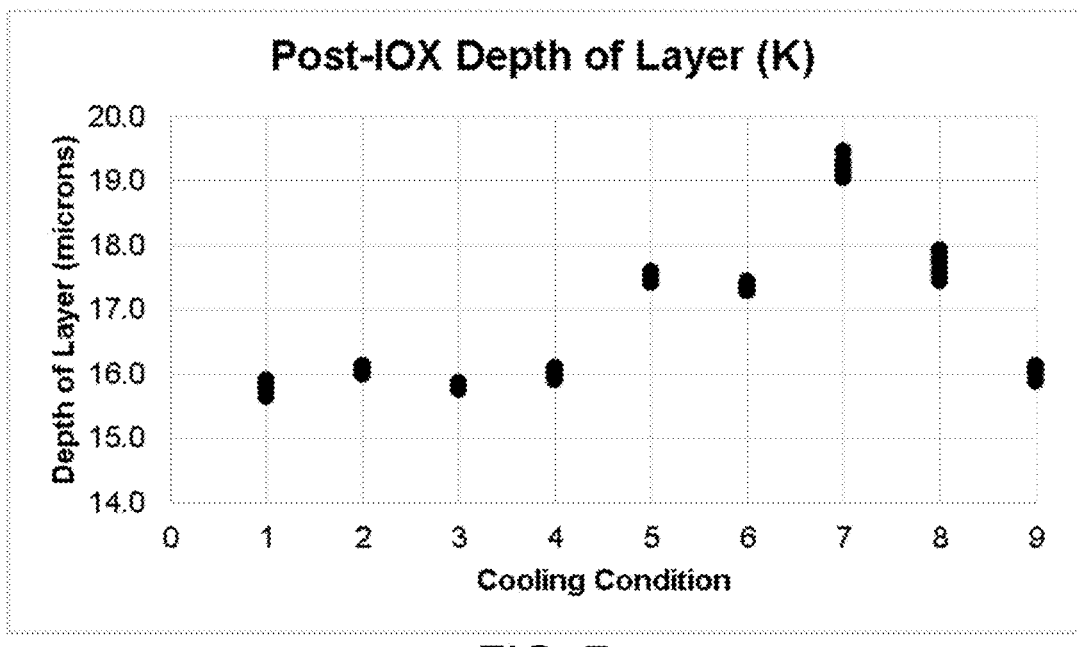
FIG. 7 is a graph showing depth of layer with respect to potassium (post-IOX and/or pre-etch) versus cooling condition for Example 1.
Figure 8:
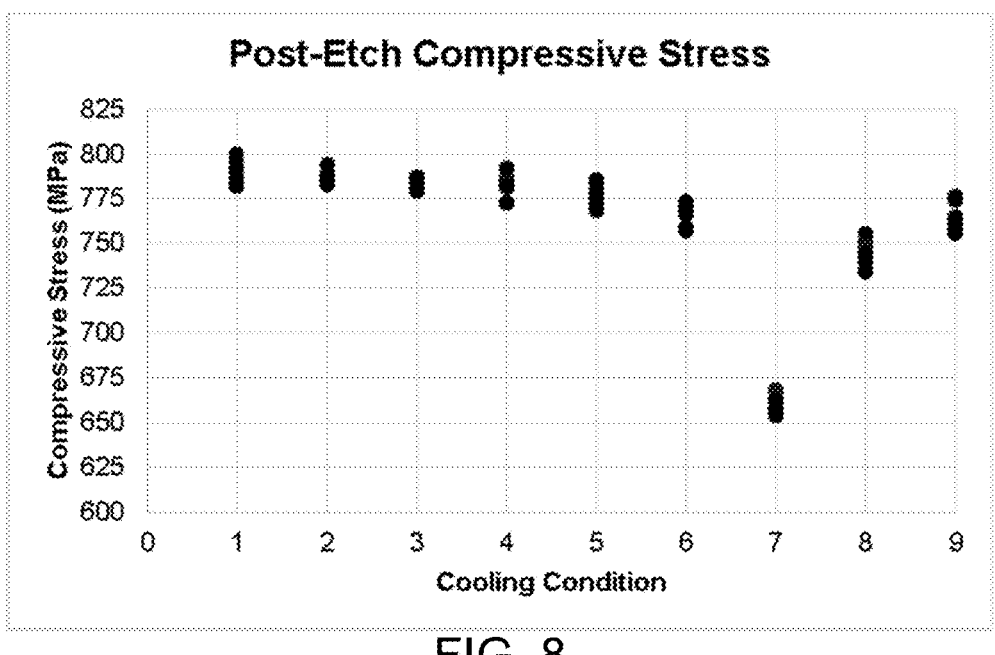
FIG. 8 is a graph showing compressive stress (MPa) (post-etch) versus cooling condition for Example 1.
Figure 9:
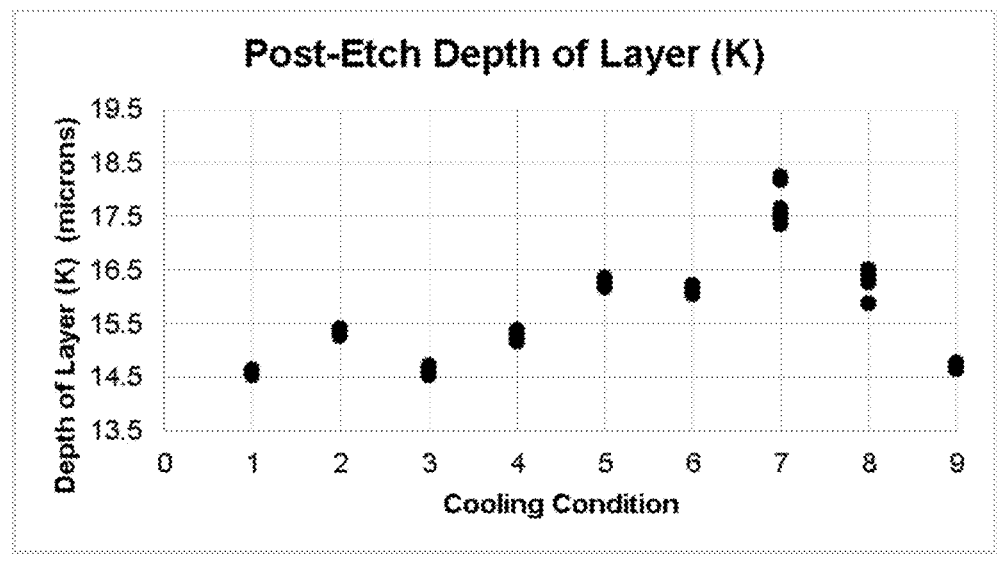
FIG. 9 is a graph showing depth of layer with respect to potassium (post-etch) versus cooling condition for Example 1.
Figure 10:
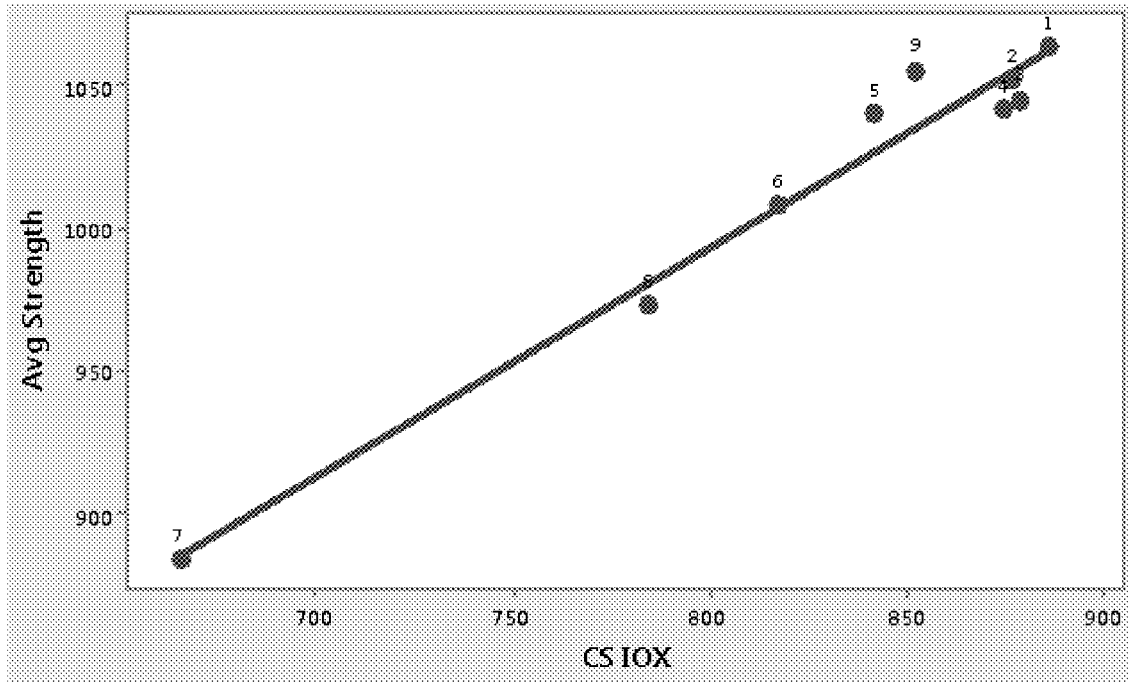
FIG. 10 is a graph showing Average Bend Strength (MPa) versus CS Post-IOX (MPa) for embodiments herein.
Figure 11:
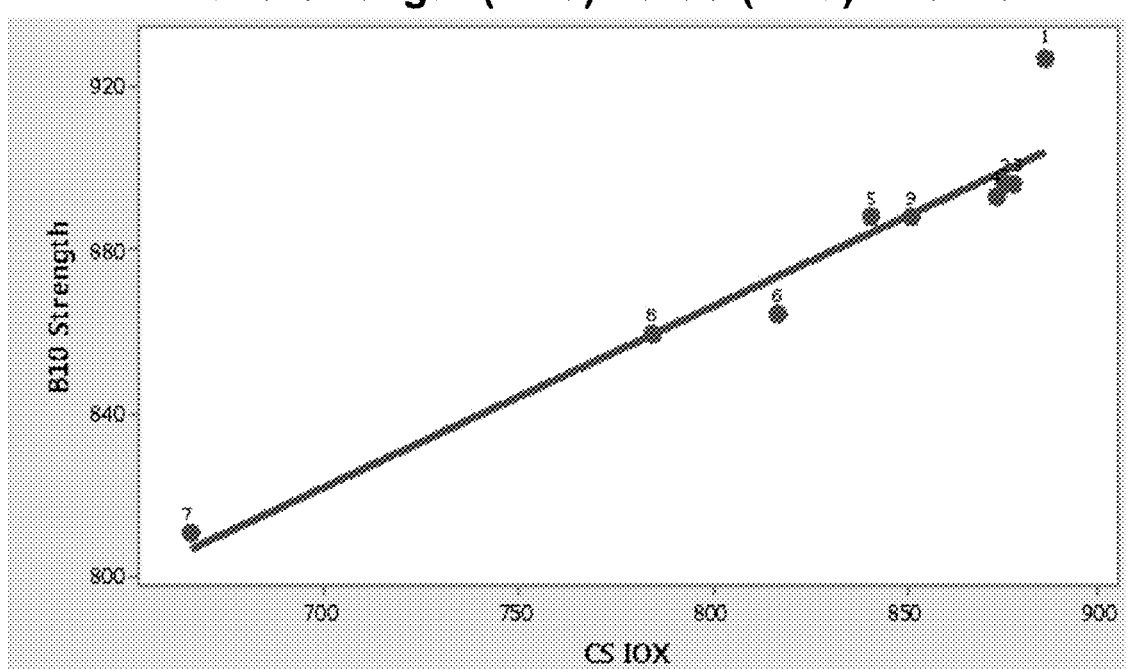
FIG. 11 is a graph showing B10 Bend Strength (MPa) versus CS Post-IOX (MPa) for embodiments herein.

Graphs showing compressive stress (MPa) versus cooling condition are provided in FIG. 6 for post-IOX and/or pre-etch, and FIG. 8 for post-etch. Graphs showing depth of layer with respect to potassium (K) versus cooling condition are provided in FIG. 7 for post-IOX and/or pre-etch, and FIG. 9 for post-etch.

Tables 4.A and 4.B contain, respectively, averaged results (for the 8 samples prepared for each condition) as measures by a surface stress meter (FSM) for: compressive stress (MPa) post-IOX and/or pre-etch and post-etch; and depth of layer with respect to potassium ($DOL_K$) post-IOX and/or pre-etch and post-etch.

TABLE 4.A

| Condition | Avg. Compressive Stress (MPa) Post-IOX | Avg. Compressive Stress (MPa) Post-Etch | Avg. CS Loss Post-IOX to Post-Etch |
|---|---|---|---|
| 1 | 885.4 | 788.5 | 96.9 |
| 2 | 875.5 | 786.5 | 89.0 |
| 3 | 877.8 | 784.0 | 93.8 |
| 4 | 873.3 | 782.0 | 91.3 |
| 5 | 841.3 | 776.3 | 65.0 |
| 6 | 816.5 | 765.9 | 50.6 |
| 7 | 664.9 | 660.0 | 4.9 |
| 8 | 784.1 | 743.6 | 40.5 |
| 9 | 851.3 | 764.3 | 87.0 |

TABLE 4.B

| Condition | Avg. $DOL_K$ Post-IOX | Avg. $DOL_K$ Post-Etch | Avg. $DOL_K$ Loss Post-IOX to Post-Etch |
|---|---|---|---|
| 1 | 15.8 μm 0.2117 · t | 14.6 μm 0.1957 · t | 1.2 |
| 2 | 16.1 μm 0.2147 · t | 15.3 μm 0.2047 · t | 0.8 |
| 3 | 15.8 μm 0.2117 · t | 14.6 μm 0.1957 · t | 1.2 |
| 4 | 16.0 μm 0.2147 · t | 15.3 μm 0.2037 · t | 0.7 |
| 5 | 17.5 μm 0.2337 · t | 16.2 μm 0.2167 · t | 1.3 |
| 6 | 17.3 μm 0.2317 · t | 16.1 μm 0.2157 · t | 1.2 |
| 7 | 19.2 μm 0.2567 · t | 17.7 μm 0.2377 · t | 1.5 |
| 8 | 17.7 μm 0.2367 · t | 16.3 μm 0.2187 · t | 1.4 |
| 9 | 16.1 μm 0.2147 · t | 14.7 μm 0.1967 · t | 1.4 |

From the information in FIGS. 6-9 and Tables 4.A and 4.B, it is concluded that the longer the glass is exposed to higher temperatures, the greater the detrimental impact on CS and $DOL_K$. There was no significant difference in the performance when cooling starts at 200° C. Increasing the cooling starting temperature to 400° C. has a significantly higher impact on the CS and $DOL_K$.

For condition 1, which had the most rapid cooling rate (6.6° C./min) at the lowest starting ambient temperature (200° C.), there were excellent CS and $DOL_K$ both post-IOX and post-etch. For condition 2 also at the lowest starting temperature (200° C.) for a slightly slower cooling rate (3.3° C./min), directionally relative to condition 1, there was a small decrease in CS and a corresponding increase in $DOL_K$. For condition 3 also at the lowest starting temperature (200° C.), there was a small decrease in CS and no change in $DOL_K$ compared with condition 1. For condition 4 also at the lowest starting temperature (200° C.), there was a small decrease in CS and a corresponding increase in $DOL_K$ compared with condition 1. The data shows faster cooling demonstrates slightly improved CS retention at lower starting ambient temperatures (200° C.).

For conditions 5-8 at starting ambient temperatures of 400° C., the longer the glass remained at elevated temperatures, e.g., the more slowly the glass is cooled, the greater the impact to CS and $DOL_K$ performance. Additionally, even fast cool from a higher starting ambient temperature significantly negatively impacts performance (for example, ability to achieve or retain higher CS).

For condition 9, the starting ambient temperature for cooling was set at 250° C. in the head space (prior to opening the lid of the salt bath). Condition 9 included the increased drip time of 10 minutes, which exposed the head space to the higher temperature of the IOX bath. As a result, the cooling start temperature in fact in the head space was measured to be 350° C. The CS was slightly higher than condition 5 which had a slightly higher starting temperature (400° C.).

Examples A-B

Comparative

Substrates were chemically thinned to 75 micrometers (μm). Cooling was conducted in comparative vessels.

In Comparative Example A, a different vessel was used for processing as compared to Example 1 and Comparative Example B. The substrates were exposed to the same ion exchange conditions (time and temperature) as Example 1. Cooling was conducted by way of programmable cooling without forced cooling. With programmable cooling, the equipment monitored head space temperature to hit pre-determined set points. There was not forced cooling (fans with venting) present. The head space had vents only, which opened to allow heat to escape at its own rate.

The post-IOX process started at ~225° C. and quickly increased to 300° C. during a 10 minute drip time. After drip, the glass began cooling in an enclosed chamber, then it moved to an open (bottomless) chamber, and finally to open ambient air over the course of ~180 minutes. The cooling rate varied with each new environment and was not controlled.

In Comparative Example B, a different vessel was used for processing as compared to Example 1 and to Comparative Example A. The substrates of Comparative Example B were exposed to the same ion exchange conditions (time and temperature) as Example 1. Cooling was conducted utilizing ambient (environmental) cooling, there was not a head space with controlled cooling. The cooling rate could not be measured in the equipment being used, but the cooling rate was likely faster than that of Comparative Example A because exposure to the air allows for faster heat diffusion as compared to a heated/cooled head space with a vent. The parts began cooling in an environment that was at room temperature, which was in the range of 20° C. to 40° C. The performance data of Comparative Example B was highly variable, likely due to the cooling rate being dependent on ambient (environmental) temperatures.

As shown in Table 5, Comparative Example B cooling process yielded better CS and $DOL_K$ results, as measured by FSM, than Comparative Example A.

TABLE 5

| Example | Avg. Compressive Stress (MPa) Post-IOX | Avg. $DOL_K$ Post-IOX |
|---|---|---|
| Comparative A | 791 | 14.7 |
| Comparative B | 840 | 16.4 |

Comparative Example A had a slower cooling rate than Comparative Example B and had a correspondingly lower performance.

Example 2

Testing

2-Point Bend Strength. 2-Point bend strength was measured by testing the samples as follows. The samples were stressed at a constant rate of 250 MPa/sec. For the two point bending protocol, see S. T. Gulati, J. Westbrook, S. Carley, H. Vepakomma, and T. Ono, "45.2: Two point bending of thin glass substrates," in SID Conf., 2011, pp. 652-654. The environment was controlled at 50% relative humidity and 25° C. The data represents maximum stress at failure and assumes that the failure occurs at the minimum radius location. Failure occurs when a sample is mechanically broken. Platens used during testing are top and bottom surfaces that hold the sample in a bend and move towards each other to achieve the different bend radii. A simple approximation assuming a circular bend is that the bend radius is one-half of the platen spacing.

Table 6 lists Average Bend Strength, B10 (MPa), B90 Platen Spacing at 2-Point Bend Failure (mm), and Average Platen Spacing at 2-Point Bend Failure (mm) resulting from the 2-point bend strength testing for the samples of Example 1 and Comparative Example A based on the same post-IOX etch and edge processing. Average Bend Strength denotes the stress at failure averaged among the samples tested. The B10 Bend Strength is the flexural stress at 10% failure probability. This means that 10% of the sample population will have a strength below this value and 90% will have a strength above this value. B90 Platen Spacing at 2-Point Bend Failure is essentially the inverse of B10 Bend Strength. B90 Platen Spacing denotes the platen spacing at which 90% of the parts survive. Average Platen Spacing at 2-Point Bend Failure denotes the platen spacing at failure averaged among the samples tested.

TABLE 6

| Condition | Average Bend Strength (MPa) | B10 Bend Strength (MPa) | B90 Platen Spacing at 2-Point Bend Failure (mm) | Average Platen Spacing at 2-Point Bend Failure (mm) |
|---|---|---|---|---|
| 1 | 1064 | 927 | 6.5 | 6.1 |
| 2 | 1053 | 896 | 6.9 | 6.2 |
| 3 | 1046 | 896 | 6.6 | 6.1 |
| 4 | 1042 | 893 | 6.8 | 6.2 |
| 5 | 1041 | 888 | 6.8 | 6.3 |
| 6 | 1009 | 864 | 7.1 | 6.4 |
| 7 | 884 | 811 | 7.9 | 7.3 |
| 8 | 973 | 859 | 7.0 | 6.6 |
| 9 | 1056 | 888 | 7.0 | 6.4 |
| Comparative A | 892 | 665 | 9.0 | 7.8 |

Figure 12:
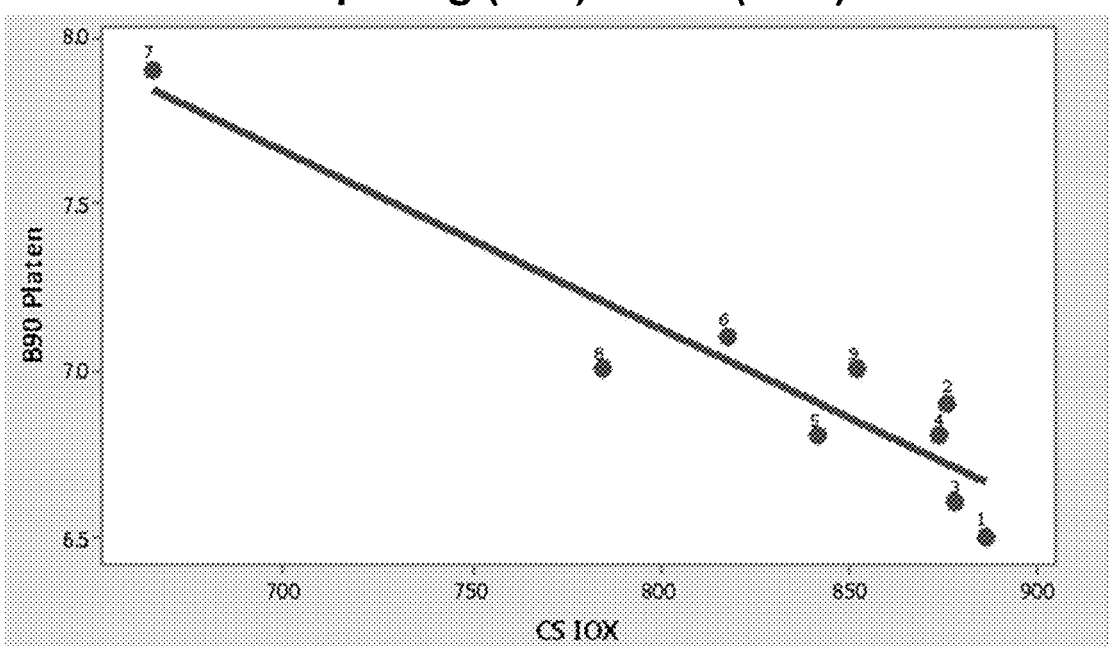
FIG. 12 is a graph showing B90 Platen Spacing at 2-Point Bend Failure (mm) versus CS Post-IOX (MPa) for embodiments herein.
Figure 13:
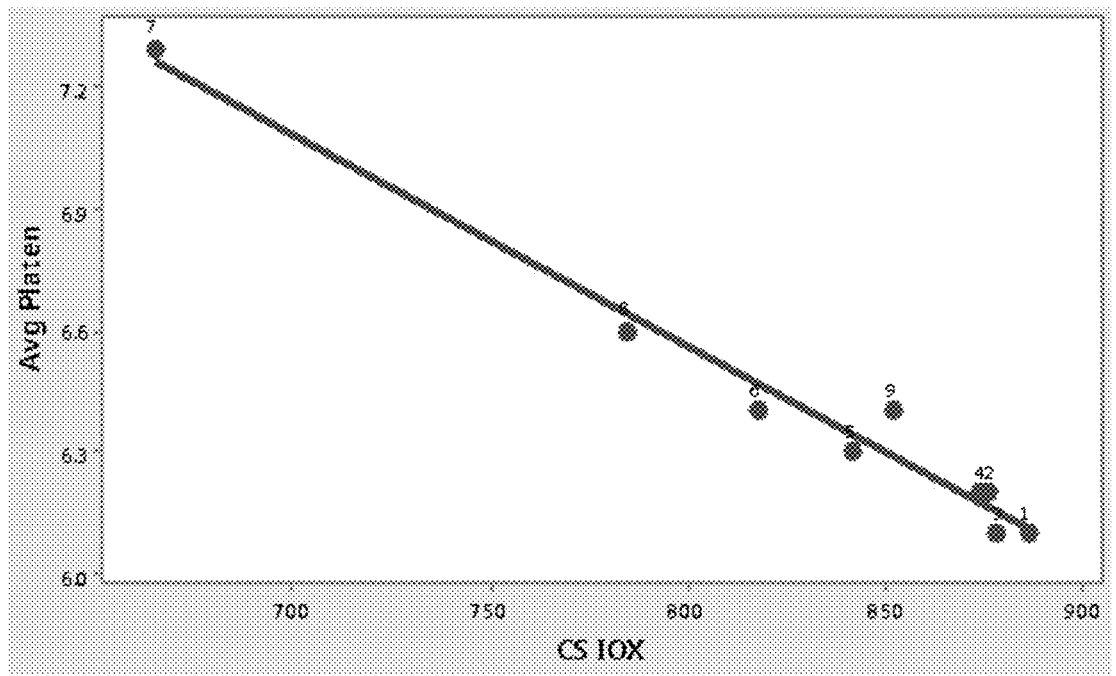
FIG. 13 is a graph showing Average Platen Spacing at 2-Point Bend Failure (mm) versus CS Post-IOX (MPa) for embodiments herein.

Higher CS typically corresponds to higher bend strength. For Example 1, conditions 1-9, FIGS. 10-13 are graphs of Average Bend Strength (MPa), B10 Bend Strength (MPa), B90 Platen Spacing at 2-Point Bend Failure (mm), and Average Platen Spacing at 2-Point Bend Failure (mm) all versus CS Post-IOX, respectively. As CS of a sample increases, bend performance improves shown by increased bend strength (FIGS. 10-11), and the glass achieves a tighter bend radius (FIGS. 12-13). For example, Condition 1 of Example 1 had the highest Post-IOX CS and also had the highest bend strength. CS and bend performance have a linear relationship. As CS increases, bend strength also increases. Similarly, as CS increases, minimum bend radius decreases.

IOX treatments produce a stress profile in a glass, e.g., an ultra-thin bendable glass. As shown herein, post-ion exchange cooling rate and cooling start temperature (temperature of the ambient environment at the start of the cooling cycle) can impact the IOX treatment-generated stress profile in ultra-thin bendable glass, which in turn can impact the bend performance (strength, radius). For example, loss of CS on cooling can decrease bend strength and increase minimum bend radius. Faster cooling rates and lower cooling start temperatures preserved CS and resulted in excellent bend performance. Post-ion exchange cooling can be modified to generate a preferred stress profile based on needed CS and/or DOL.

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of manufacturing a glass-based article comprising:

conducting an ion exchange treatment and a cooling in a vessel that defines: a reservoir containing a molten salt bath, a head space within the vessel above the molten salt bath, and a vent in fluid communication with the head space, wherein a movable partition resides within the vessel such that a first position of the movable partition puts the reservoir in fluid communication with the head space and a second position of the movable partition separates the reservoir from the head space;

the ion exchange treatment comprising: exposing an alkali-aluminosilicate glass-based substrate comprising opposing first and second surfaces defining a substrate thickness (t) to a molten salt bath disposed in the reservoir to form an ion exchanged glass-based substrate, the substrate thickness (t) being greater than or equal to 25 micrometers and less than or equal to 125 micrometers; and thereafter the cooling of the ion exchanged glass-based substrate in the head space comprising:

moving the movable partition to the second position;

setting a starting temperature of the head space to less than or equal to 200° C.; and reducing the starting temperature at a rate of greater than or equal to 3.3° C./minute and less than or equal to 25° C./minute;

wherein upon cooling for a cooling duration, the glass-based article is formed.

2. The method of claim 1, wherein the rate is greater than or equal to 6.0° C./minute.

3. The method of claim 1, wherein:

the ion exchange treatment comprises:

moving the movable partition to the first position;

immersing the alkali-aluminosilicate glass-based substrate in the molten salt bath and moving the movable partition to the second position;

obtaining the ion exchanged glass-based substrate after a treatment duration defined by time that the alkali-aluminosilicate glass-based substrate resides in the molten salt bath;

moving the movable partition to the first position and withdrawing the ion exchanged glass-based substrate from the molten salt bath into the head space; and holding the ion exchanged glass-based substrate in the head space in place above the molten salt bath for a drip duration defined by time after withdrawal of the ion exchanged glass-based substrate out the reservoir and into the head space before the cooling begins, wherein any residual salt drips off of the ion exchanged glass-based substrate back into the reservoir.

4. The method of claim 3, wherein the drip duration excludes any setting of a temperature of the head space to a temperature of greater than 200° C.

5. The method of claim 1, wherein the molten salt bath is at a temperature in the range of greater than or equal to 360° C. to less than or equal to 500° C.

6. The method of claim 1, wherein the cooling duration is less than or equal to 60 minutes.

7. The method of claim 1, wherein the cooling duration is less than or equal to 30 minutes.

8. The method of claim 1, wherein the cooling is conducted until the head space is at a temperature of less than or equal to 70° C.

9. The method of claim 1, wherein the cooling is conducted until the head space is at a temperature in the range of greater than or equal to 50° C. to less than or equal to 70° C.

10. The method of claim 1, wherein the glass-based substrate is lithium-free.

11. The method of claim 1, wherein the glass-based substrate comprises in mole percentages: 66-70% $SiO_2$, 9-12% $Al_2O_3$, 14-16% $Na_2O$, 4.5-5.5% MgO, 0.01-0.09% CaO, and 0.10-0.20% SnO.

12. The method of claim 1, wherein the glass-based substrate comprises in mole percentages ±0.5%: 69% $SiO_2$, 10% $Al_2O_3$, 15% $Na_2O$, 5% MgO, 0.1% CaO, and 0.2% SnO.

13. The method of claim 1, wherein the glass-based article comprises a maximum compressive stress ($CS_{max}$) of greater than or equal to 780 MPa.

14. The method of claim 1, wherein the glass-based article comprises a maximum compressive stress ($CS_{max}$) of greater than or equal to 780 MPa and a depth of layer ($DOL_K$) of greater than or equal to 0.19·t.

15. The method of claim 1, wherein prior to the ion exchange treatment, the glass-based substrate is preheated in the head space.

16. The method of claim 1, the glass-based substrate comprises a plurality of glass-based substrates loaded into a fixture.

17. A glass-based article made in accordance with claim 1.

18. The glass-based article of claim 17 comprising a maximum compressive stress ($CS_{max}$) of greater than or equal to 750 MPa.

19. The glass-based article of claim 17 comprising a depth of layer ($DOL_K$) with respect to potassium of greater than or equal to 0.19·t micrometers.

20. The glass-based article of claim 17 comprising a maximum compressive stress ($CS_{max}$) of greater than or equal to 750 MPa and a depth of layer ($DOL_K$) of greater than or equal to 0.19·t.

21. A consumer electronic product comprising:

a housing comprising a front surface, a back surface, and side surfaces;

electrical components at least partially within the housing, the electrical components comprising at least a controller, a memory, and a display, the display at or adjacent the front surface of the housing; and a cover disposed over the display;

wherein a portion of at least one of the housing and the cover comprises the glass-based article of claim 17.

\* \* \* \* \*